United States Patent
Nakagawa et al.

(10) Patent No.: US 6,773,826 B2
(45) Date of Patent: Aug. 10, 2004

(54) PERPENDICULAR MAGNETIC RECORDING MEDIA AND MAGNETIC STORAGE APPARATUS USING THE SAME

(75) Inventors: Hiroyuki Nakagawa, Yokohama (JP); Hiroaki Nemoto, Kokubunji (JP); Yuzuru Hosoe, Hino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/076,420

(22) Filed: Feb. 19, 2002

(65) Prior Publication Data

US 2003/0059650 A1 Mar. 27, 2003

(30) Foreign Application Priority Data

Sep. 19, 2001 (JP) ........................................ 2001-285306

(51) Int. Cl.[7] ................................................. G11B 5/64
(52) U.S. Cl. ........................ 428/637; 428/660; 428/667; 428/668; 428/678; 428/336; 428/428 TP; 428/428 TM
(58) Field of Search ................................. 428/637, 660, 428/667, 668, 678, 336, 694 TP, 694 TM

(56) References Cited

U.S. PATENT DOCUMENTS

| | | | |
|---|---|---|---|
| 5,763,071 A | * | 6/1998 | Chen et al. .................. 428/332 |
| 5,851,643 A | * | 12/1998 | Honda et al. ................ 428/212 |
| 6,500,530 B1 | * | 12/2002 | Sawamura et al. .......... 428/212 |
| 2001/0051287 A1 | * | 12/2001 | Kikitsu et al. ........ 428/694 ML |
| 2002/0012816 A1 | * | 1/2002 | Shimizu et al. ...... 428/694 TM |
| 2002/0018917 A1 | * | 2/2002 | Sakai et al. .......... 428/694 TM |
| 2002/0132140 A1 | * | 9/2002 | Igarashi et al. ...... 428/694 TM |
| 2002/0150793 A1 | * | 10/2002 | Maeda et al. ......... 428/694 TM |
| 2003/0059651 A1 | * | 3/2003 | Shimizu et al. ...... 428/694 TM |

FOREIGN PATENT DOCUMENTS

| | | |
|---|---|---|
| JP | 9-91660 | 4/1997 |
| JP | 2000-113442 | 4/2000 |

OTHER PUBLICATIONS

Gambino, R., Rug, R., and R. Rishi, IEEE Trans. Mag., 25(5), 1989, 3749–3751.*

* cited by examiner

*Primary Examiner*—Paul Thibodeau
*Assistant Examiner*—Kevin M Bernatz
(74) *Attorney, Agent, or Firm*—Antonelli, Terry, Stout & Kraus, LLP

(57) ABSTRACT

A perpendicular magnetic recording medium and a magnetic storage apparatus, which show an excellent S/N ratio and are suitable for ultra high density magnetic recording, are provided. In the perpendicular magnetic recording medium having a recording layer composed of at least two layers of a main recording layer formed above a substrate and a thermally-stabilizing layer formed on the main recording layer, the thermally-stabilizing layer being formed closer to a surface of the medium than the main recording layer, alloy containing Co and Cr as a main component, which shows a low noise property, is used as the main recording layer, amorphous alloy containing rare earth metals and 3d transition metals as a main component, which is excellent in thermal stability, is used as the thermally-stabilizing layer, and a cap layer formed of alloy containing Co and Cr as a main component is formed on a surface of the thermally-stabilizing layer.

12 Claims, 6 Drawing Sheets

PERPENDICULAR MAGNETIC RECORDING MEDIA AND MAGNETIC STORAGE APPARATUS USING THE SAME

BACKGROUND OF THE INVENTION

1. Field of the Invention

The present invention relates to a perpendicular magnetic recording medium which is excellent in thermal stability of recorded magnetization and suitable for a high density magnetic recording and a magnetic storage apparatus using the same.

2. Descriptions of the Related Arts

In an longitudinal magnetic recording system used in magnetic disc apparatuses of nowadays, to increase a linear recording density, demagnetization fields in recorded bits must be reduced by reducing a product (Br·t) of remanent magnetization (Br) of a magnetic film as a recording medium and a thickness (t) of the magnetic film. At the same time, a coercive force of the magnetic film must be increased. Moreover, to reduce medium noise, an easy axis of magnetization of the magnetic film must be made to be in parallel with a substrate surface, and a reduction in both an average crystal grain size and the crystal grain size distribution is necessary. To satisfy such an object, a thickness of the magnetic film must be made as thin as 20 nm or less, and the crystal grain size must be made as minute as 10 nm. However, in the medium having such magnetic crystal grains micronized, there is a problem that the recorded magnetization is reduced due to thermal agitation, and the thermal decay of the recorded magnetization is obstacles to realize a high density recording.

On the other hand, a perpendicular magnetic recording system is the one which forms recorded bits so that a magnetization direction of a recording medium is perpendicular to a medium surface and magnetization directions in recorded bits adjacent to each other are in anti-parallel. Since demagnetization fields at magnetization transition regions are smaller compared to the longitudinal recording system, the medium noise can be reduced, and recorded magnetization at high recording densities can be stably retained. Also in the perpendicular magnetic recording, to increase the linear recording density, it is necessary to reduce medium noise generated from irregular magnetic domains which are formed inside the recorded bits and the magnetization transition regions. To reduce the medium noise, an easy axis of magnetization of the magnetic film must be oriented so as to be perpendicular to the substrate surface. At the same time, a dispersion angle of the easy axis of magnetization is made small, and a crystal grain size of the magnetic layer must be controlled.

As a perpendicular magnetic film, a Co alloy having a hexagonal closed-packed (hcp) structure is mainly used. When a CoCr-based alloy thin film which is obtained by adding Ta, Pt, Rh, Pd, Ti, Ni, Nb, Hf and the like to Co and Cr as a main component is used, good properties can be achieved as the perpendicular magnetic film. The Co alloy thin film has an easy axis of magnetization in a c-axis direction of the hcp structure, that is, in a <00.1> direction, and the easy axis of magnetization is oriented in a direction perpendicular to a film surface thereof. The magnetic thin film is formed by use of a vacuum evaporation method and a sputtering method. A c-axis orientation of the Co alloy thin film to a direction perpendicular to a film surface thereof must be enhanced, and a crystal grain size must be controlled to a suitable size. To achieve such an object, reform measures in which an underlayer for structure control is formed between a substrate and a magnetic film have heretofore been adopted.

On the other hand, as a perpendicular magnetic recording medium which is made of materials other than the CoCr-based alloy series materials, amorphous alloy made of rare earth-transition metals such as TbFeCo has been known. Furthermore, also a thin film formed of a multilayer film such as (Co/Pd)n and (Co/Pt)n has been investigated, which is obtained by alternately laminating Co films of a thickness of 1 nm or less and Pd films of a thickness of 1 nm or less or by alternately laminating the Co films and Pt films of a thickness of 1 nm or less. These films show a strong exchange interaction between magnetic grains unlike the CoCr-based alloy film, and a squareness thereof is approximately 1. Therefore, these films are excellent in thermal stability and a signal-to-noise (S/N) ratio at low recording densities.

In Japanese Patent Application Laid-Open No. 9(1997)-91660, a magnetic recording medium in which first and second recording layers having different properties from each other are laminated is disclosed. In Japanese Patent Application Laid-Open No. 12(2000)-113442, a magnetic recording medium is disclosed, in which a magnetic film having a high magnetic anisotropy energy is formed on/beneath a magnetic film made of a Co alloy as a main recording layer, thus reducing medium noise and thermal fluctuations.

Though the foregoing perpendicular magnetic recording medium made of the CoCr-based alloy shows a low noise, this medium does not have sufficient resistance to the thermal fluctuations. On the other hand, though the perpendicular magnetic recording medium made of the amorphous alloy of the rare earth-transition metals such as TbFeCo and made of the multilayer film such as (Co/Pd)n and (Co/Pt)n is excellent in the thermal stability and the signal-to-noise (S/N) ratio at low recording densities, the perpendicular magnetic recording medium has a problem that the medium noise at high recording densities is large. The perpendicular magnetic recording films as the prior arts disclosed in Japanese Patent Application Laid-Open No. 9(1997)-91660 and 12(2000)-113442 use the multilayer structure film such as Co/Pd and the amorphous alloy film containing the rare earth-transition metals as the second magnetic film. The former has a problem that there is a difficulty in manufacturing it industrially, and the later shows a poor corrosion resistance because the latter contains the corrosive rare earth metals. Moreover, the inventors of the present invention found newly that when a rare earth-3d transition metal amorphous alloy is used as the recording layer, this layer and carbon used as a protective film react with each other, so that sufficient thermal stability and signal-to noise ratio cannot be obtained at a thin area in which a thickness of the recording layer is equal to several nm or less.

SUMMARY OF THE INVENTION

With a recognition of the foregoing problems, an object of the present invention is to provide a perpendicular magnetic recording medium and a magnetic storage apparatus which are capable of solving the foregoing drawbacks of the prior arts, excellent in thermal stability and an S/N ratio, and suitable for a high density magnetic recording.

To achieve the foregoing object, the perpendicular magnetic recording medium of the present invention comprises: a magnetic layer formed above a substrate, which contains Co and Cr as main components; a first layer formed on an opposite side of the magnetic layer relative to the substrate, the first layer including an amorphous alloy layer containing rare earth metals and 3d transition metals as a main component; and a second layer formed on the first layer, the second layer containing Co and Cr. The second layer may be one formed of Co and Cr.

The first layer may be a multilayer film composed of an amorphous alloy layers and other layers, the amorphous alloy layers containing rare earth metals and 3d transition metals as a main component. As layers inserted between the amorphous alloy layers, alloy films containing Co and Cr as a main component may be used. By forming the first layer to be multilayered, it is possible to control a decay rate of signals to a negligible level for practical use, and to increase an S/N ratio.

A thickness of the first layer should range from 2 to 10 nm. By setting the thickness of the first layer to the range from 2 to 10 nm, it is possible to control the decay rate of the signals to the negligible level for practical use, and to obtain a high S/N ratio. Satisfactory thermal stability cannot be obtained at a region where the thickness of the first layer is less than 2 nm. When the thickness thereof is equal to 10 nm or more, the S/N ratio is lowered though the thermal stability is not a problem.

The first layer can contain TbFeCo, TbCo or TbFe as a main component. The first layer is suitable for industrial productions by allowing the first layer to contain these materials as the main component.

A thickness of the second layer should range from 0.5 to 10 nm. By setting the thickness of the second layer to the range from 0.5 to 10 nm, it is possible to obtain good magnetic properties and recording characteristics at a region where the thickness of the first layer is several nm or less. When the thickness thereof is less than 0.5 nm, a reaction of the second layer with C (carbon) of a protective film cannot be suppressed sufficiently, and thermal stability and an S/N ratio are lowered. When the thickness of the second layer is greater than 10 nm, the thermal stability is improved compared to a case where there is no second layer. However, lowering of a recording resolution and the S/N ratio is caused because a magnetic spacing, which is defined as spacing between a head and a soft-magnetic underlayer, is widened, and because magnetic properties such as coercive force and saturated magnetization of the second layer are not excellent.

The magnetic storage apparatus of the present invention comprises a perpendicular magnetic recording medium and a thin film head including a magnetic recording head and a signal reproduction head, wherein the perpendicular magnetic recording medium has: a magnetic layer containing Co and Cr as a main component, formed above a substrate; a first layer including an amorphous alloy layer formed on an opposite side of the magnetic layer relative to the substrate, the amorphous alloy layer containing rare-earth metals and 3d transition metals; and a second layer containing Co and Cr, formed on the first layer including the amorphous alloy layer. As the magnetic recording head, a ring-type head or a single-pole-type head can be used. As the signal reproduction head, a magnetoresistive head, a spin valve type head or a tunneling magnetoresistive head can be used.

DETAILED DESCRIPTION OF THE PREFERRED EMBODIMENTS

Figure 1A:
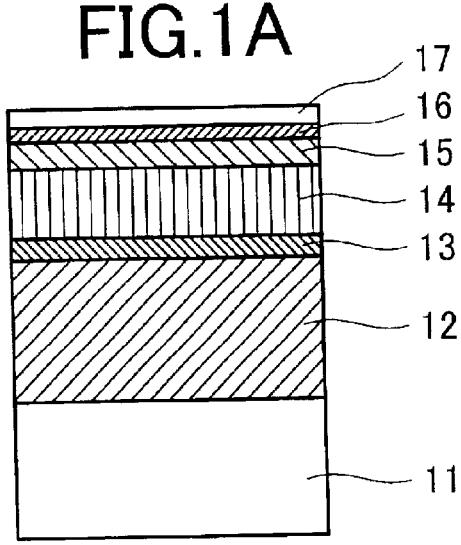
FIG. 1(a) is a schematic section view showing a fundamental structure of a perpendicular magnetic recording medium of the present invention.
Figure 1B:
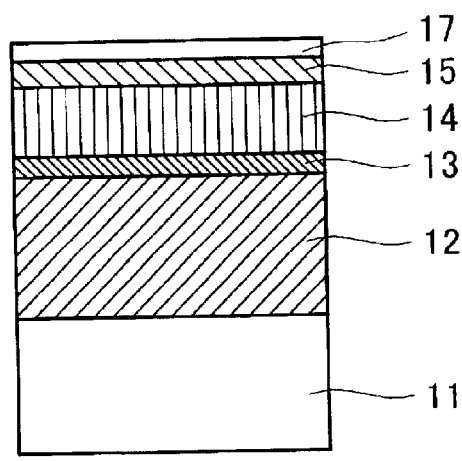
FIG. 1(b) is a schematic section view showing a structure of a conventional perpendicular magnetic recording medium.
Figure 1C:
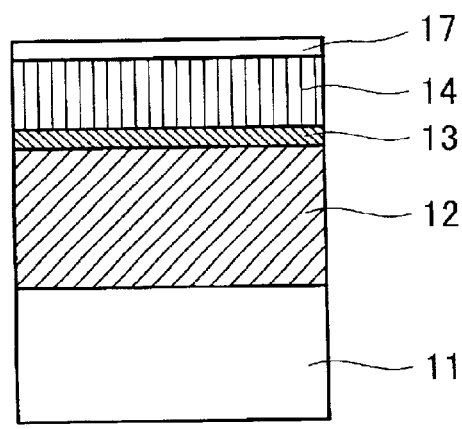
FIG. 1(c) is a schematic section view showing a structure of the conventional perpendicular magnetic recording medium.

Embodiments of the present invention will be described in detail below with reference to the accompanying drawings. In FIGS. 1(a), 1(b) and 1(c), schematic section views of a perpendicular magnetic recording medium are shown. FIG. 1(a) is a schematic section view showing a fundamental structure of the perpendicular magnetic recording medium according to the present invention. FIGS. 1(b) and 1(c) are schematic section views showing structures of a conventional perpendicular magnetic recording medium.

In FIGS. 1(a), 1(b) and 1(c), reference numeral 11 is a substrate such as a glass substrate, a silicon substrate, a carbon substrate, a NiP-coated aluminum substrate and an organic resin substrate. Reference numeral 12 denotes an underlayer. The underlayer 12 serves to enhance adhesion to the substrate 11, and a soft-magnetic layer is sometimes formed on the underlayer 12. As the soft-magnetic layer, materials such as Co—Ta—Zr amorphous alloy, Co—Nb—Zr amorphous alloy, Co—Mo—Zr amorphous alloy, Co—W—Zr amorphous alloy, Co—Ni—Zr amorphous alloy, Fe—Al—Si alloy, Fe—Ta—C alloy, and Fe—Hf—C alloy can be used.

Reference numeral 13 denotes a structure control layer, which is a layer for controlling a crystal orientation property and a grain size of a main recording layer 14. Reference numeral 14 denotes the main recording layer, which is made of a magnetic material containing Co and Cr as a main component and is a ferromagnetic thin film such as Co—Cr—Ta, Co—Cr—Pt, Co—Cr—Pt—Ta, and Co—Cr—Pt—B. Reference numeral 15 denotes a thermally-stabilizing layer, which is amorphous alloy made of rare earth metals and transition metals or a multilayer film containing amorphous alloy made of rare earth metals and transition metals. Reference numeral 16 denotes a cap layer, which is alloy containing Co and Cr as a main component. Reference numeral 17 denotes a protective and lubricant layer composed of an organic lubricant and a protective film such as carbon, silicon carbon and boron carbide.

As described above, the alloy layer containing Co and Cr as the main component, which shows a low noise property, is used as the main recording layer 14. As the thermally-stabilizing layer 15, the magnetic layer made of the amorphous alloy containing the rare earth metals and the 3d transition metals as the main component is used. Moreover, as the cap layer 16 for suppressing a reaction with the carbon film, which is used to improve corrosion resistance and as the protective film, the alloy layer containing Co and Cr as the main component is formed on the surface of the thermally-stabilizing layer 15. With such a constitution, compared to a constitution in which the cap layer 16 is not formed, a squareness is increased, and consequently thermal stability is improved. Moreover, by sandwiching the thermally-stabilizing layer 15 between the alloy films containing Co and Cr as the main component and having a grain boundary structure, a magnetic wall motion is suppressed, so that an effect of an increase in an S/N ratio in addition to an increase in the thermal stability of recorded magnetization can be obtained.

[Embodiment 1]

The medium showing a section structure in FIG. 1(*a*) was fabricated by use of a DC magnetron sputtering apparatus. After the underlayer 12 was formed at a room temperature, heating was performed to obtain a temperature of 350° C., and then the structure control layer 13, the main recording layer 14, the thermally-stabilizing layer 15, the cap layer 16 and the protective layer 17 were sequentially formed by use of a DC magnetron sputtering method. A 2.5 inch type glass substrate washed was used for the substrate 11. A Ni—37.5 at. % Ta—10 at. % Zr film was used for the underlayer 12 and the structure control layer 13. A Co—22 at. % Cr—10 at. % Pt film was used for the main recording layer 14. A Tb—83 at. % Co film was used for the thermally-stabilizing layer 15. A Co—22 at. % Cr—10 at. % Pt film or a Co—35 at. % Cr film was used for the cap layer 16. A carbon film was used for the protective layer 17.

With respect to a thickness of each layer, the underlayer 12 is 400 nm; the structure control layer 13, 5 nm; the main recording layer 14, 17 nm; the thermally-stabilizing layer 15, 3 nm; the cap layer 16, from 0.5 to 20 nm; and the protective layer 17, 5 nm. As a comparison example, a medium sample R1 without the cap layer 16 was also fabricated as shown in FIG. 1(*b*). Herein, to evaluate the dependence of the remanent magnetization of the recording layer on time, a soft-magnetic material was not used for the underlayer 12, but the nonmagnetic Ni—37.5 at. % Ta—10 at. % Zr film was used.

An output decay of a signal recorded in the magnetic recording medium is caused in such a manner that the recorded magnetization is thermally excited under magnetic fields (demagnetization fields) induced by magnetic charges appearing on the surfaces of the medium in an opposite direction to the magnetization and the recorded magnetization is partially reversed. The signal is recorded onto the medium so as to create a state where the magnetization directions in the adjacent recorded bits are in anti-parallel to each other. Consequently, influences of the demagnetization field are lessened compared to the remanent magnetization state, and thermal stability is improved as a recording density becomes higher. Specifically, if the decay rate of the magnetization after one hour at a temperature of 75° C. in the remanent magnetization state where the demagnetization field is highest can be controlled within 5%, it is possible to reduce a signal decay rate to a negligible level for practical use.

Figure 2:
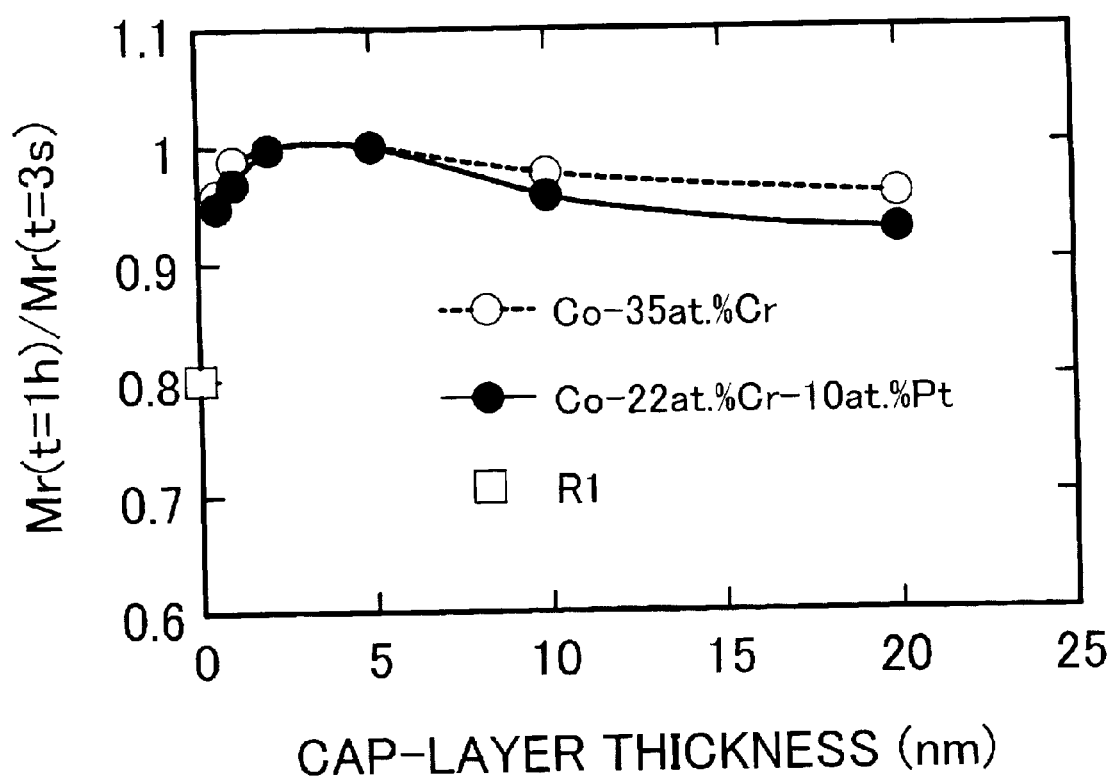
FIG. 2 is an explanatory view for explaining an effect which a thickness of a cap layer has on suppression of a decay rate of remanent magnetization.

The dependence of the magnetization in the remanent magnetization state at the temperature of 75° C. on time was measured for these magnetic recording media by use of a vibrating sample magnetometer (VSM). The remanent magnetization was evaluated as a rate (Mr (t=1 h)/Mr (t=3 s)), which means the ratio of the remanent magnetization Mr (t=3 s), when three seconds have passed after the magnetization was saturated to restore the magnetic field to zero, to the remanent magnetization Mr (t=1 h) after one hour. The time dependence of the remanent magnetization of the medium sample in which the thickness of the cap layer was changed is shown in FIG. 2. As understood from FIG. 2, by laminating the cap layer 16 such as the Co—22 at. % Cr—10 at. % Pt film and the Co—35 at. % Cr film, which has a thickness of 0.5 to 10 nm, on the thermally-stabilizing layer 15, the decay rate of the magnetization can be controlled within 5% of which is about ¼ of the comparison example R1 also in the remanent magnetization state where the demagnetization field is large. In other words, it is possible to reduce the signal decay rate to a negligible level for practical use.

Figure 3:
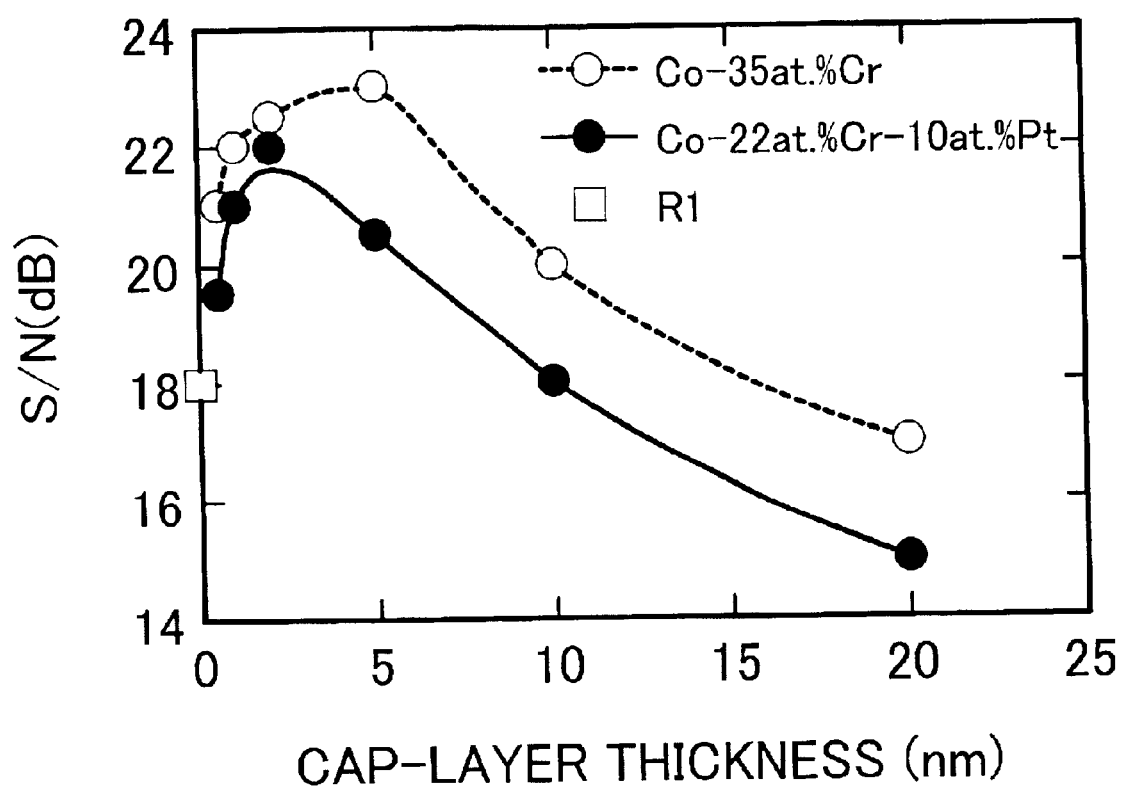
FIG. 3 is an explanatory view for explaining an effect which the thickness of the cap layer has on a signal-to-noise (S/N) ratio.

Next, recording characteristics of these magnetic recording media were evaluated by use of a recording/reproduction separation type magnetic head. A write-gap length of a ring head for recording was set to 0.3 μm; a read-track width, 1.7 μm; a shield-gap length of a giant magnetoresistive (GMR) head for reproduction, 0.16 μm; a read-track width, 1.3 μm; and a flying height, 20 nm. A signal-to-noise (S/N) ratio that is a ratio of the reproduction output (S) of 200 kFCI to the medium noise (N) was measured. Dependency of the S/N ratio on the thickness of the cap layer is shown in FIG. 3. In the medium in which as the cap layer 16 the Co—22 at. % Cr—10 at. % Pt film or the Co—35 at. % Cr film is laminated in a thickness from 0.5 to 10 nm on the thermally-stabilizing layer 15, a good S/N ratio can be obtained compared with the comparison sample R1.

Next, the thickness of the cap layer 16 was fixed to 1 nm, and a comparison sample using Ti, Ta, Nb, Pt, Pd, Cr and Ru as a material was fabricated, and then dependence of the remanent magnetization at 75° C. on time was evaluated by a similar method. The decay rate of the magnetization could be reduced to about 10% that is approximately half compared to a case where the cap layer was not provided, but the thermal stability was not sufficient for practical use. On the other hand, when the alloy of the present invention containing Co and Cr as the main component was used as the cap layer 16, the thermal stability which is sufficient for practical use can be obtained when the thickness of the alloy is 0.5 nm or more. Therefore, the alloy of the present invention is proved to be very excellent as the cap layer 16. Moreover, since the magnetic spacing can be made small, the alloy of the present invention is excellent in terms of the recording resolution.

Based on the above-described facts, it is found that the thermal stability and the high S/N ratio can be compatible with each other by setting the thickness of the cap layer 16 to the range of 0.5 to 10 nm, which is made of the alloy containing Co and Cr as the main component. It is considered that the increase of the thermal stability is due to the improvement of the magnetic properties of the thermally-stabilizing layer by suppressing the reaction of the 17 at. % Tb—83 at. % Co film constituting the thermally-stabilizing layer 15 with the carbon film constituting the protective layer and by suppressing the corrosion. Moreover, it is considered that the S/N ratio increases due to the suppression of the magnetic wall motion by sandwiching the thermally-stabilizing layer between the alloy films containing Co and Cr as the main component, the alloy films having the grain boundary structure.

[Embodiment 2]

The same layer structure as the embodiment 1 was constructed by the sputtering apparatus, in which a soft-magnetic Co—3 at. % Ta—5 at. % Zr film was used as the underlayer 12; a Ni—30 at. % Ta—10 at. % Zr film was used as the structure control layer 13; a Co—22 at. % Cr—14 at.

% Pt film was used as the main recording layer 14; a 12 at. % Tb—88 at. % Co alloy was used as the thermally-stabilizing layer 15; a Co—35 at. % Cr film was used as the cap layer 16; and a carbon film was used as the protective layer 17. A medium sample was fabricated, in which a thickness of the thermally-stabilizing layer 15 was varied within a range of 2 to 15 nm. With respect to a thickness of each of the other layers, a thickness of the underlayer 12 was set to 400 nm; a thickness of the structure control layer 13 was set to 5 nm; a thickness of the main recording layer 14 was set to 17 nm; a thickness of the cap layer 16 was set to 1 nm; and a thickness of the protective layer 17 was set to 5 nm. As a comparison example, as shown in FIG. 1(b), comparison sample series R2 in which the cap layer 16 was omitted was also prepared together with the above-described layer structure. Note that, as the comparison sample of this series, as shown in FIG. 1(c), a medium sample in which the thickness of the thermally-stabilizing layer 15 was set to zero, that is, in which the thermally-stabilizing layer 15 was not formed, was prepared.

Figure 4:
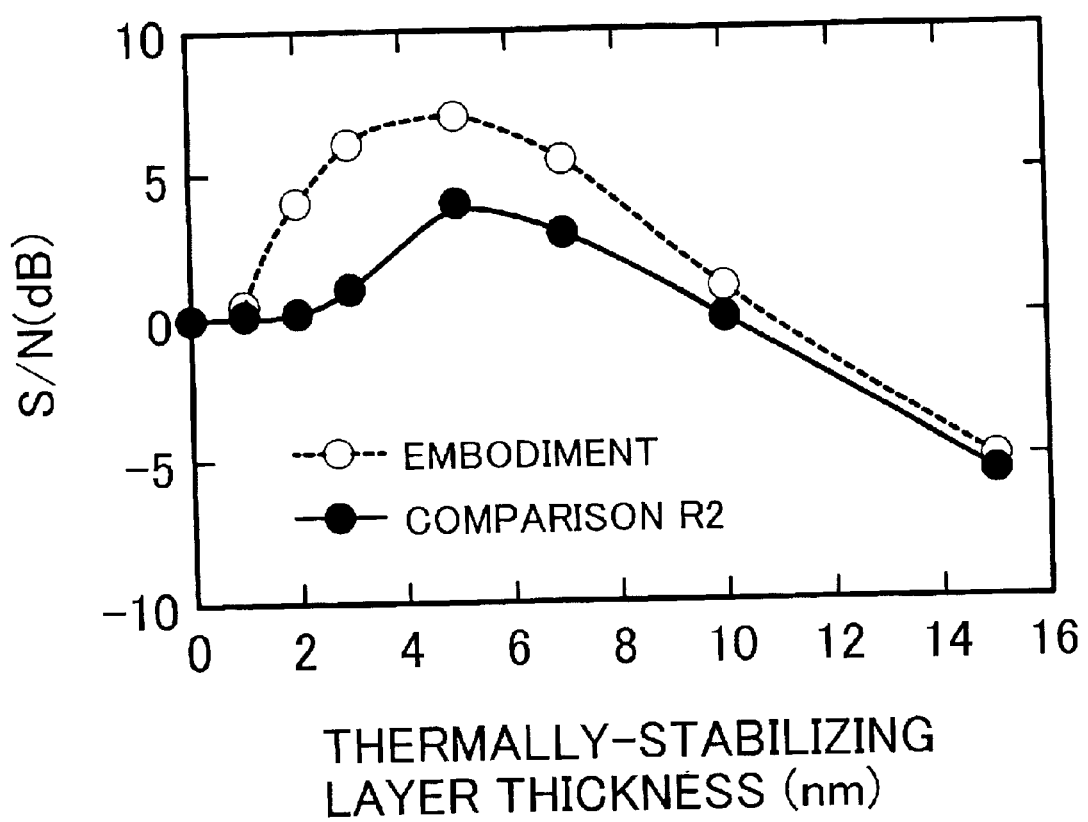
FIG. 4 is an explanatory view for explaining an effect which a thickness of a thermally-stabilizing layer has on the signal-to-noise (S/N) ratio.
Figure 5:
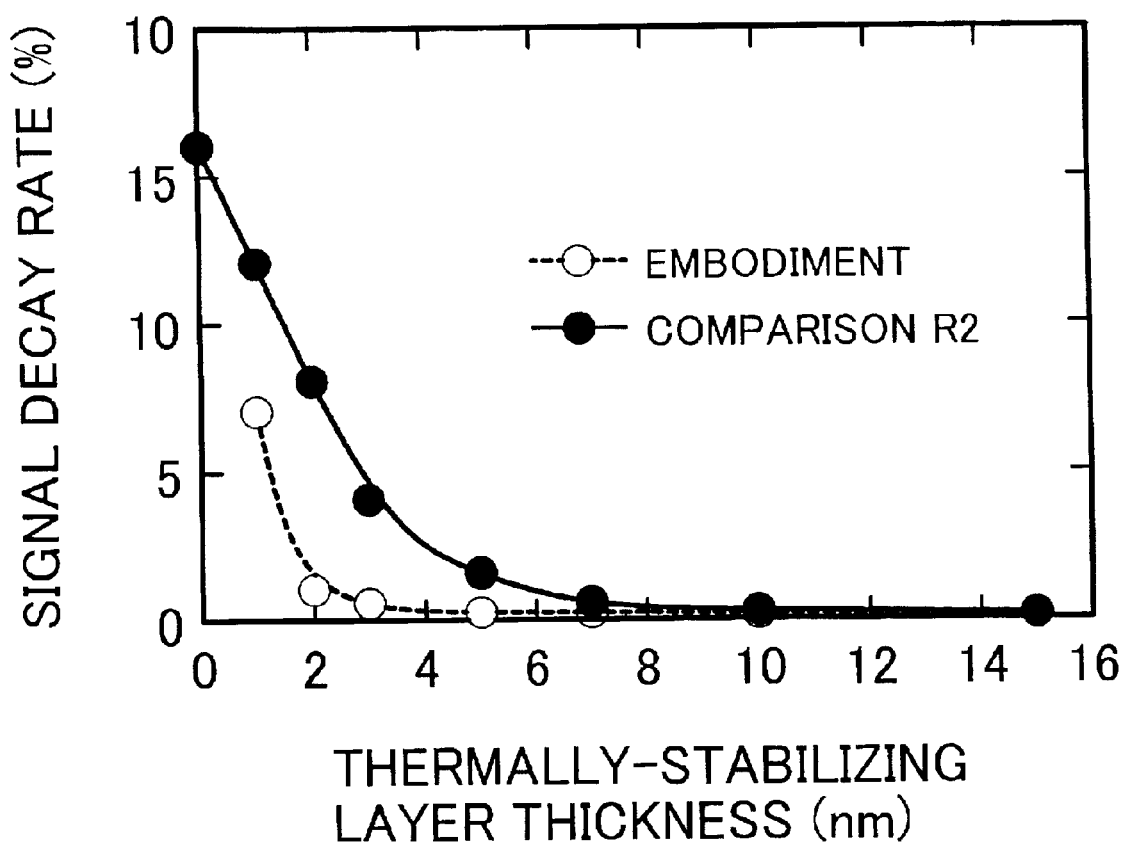
FIG. 5 is an explanatory view for explaining an effect which the thickness of the thermally-stabilizing layer has on suppression of a decay rate of signals.

For the evaluation of the recording characteristics, the same conditions (ring head recording/GMR reproduction) as those of the embodiment 1 were used. A signal-to-noise (S/N) ratio of the reproduction output (S) of 200 kFCI to the medium noise (N) was measured. A change of the S/N ratio with respect to the thickness of the thermally-stabilizing layer 15 is shown in FIG. 4. Note that the S/N value of the comparison sample series R2 is shown by a relative value obtained by setting the S/N value thereof to 0 dB when the thickness of the thermally-stabilizing layer 15 is zero. Moreover, the recording was performed for each medium sample at 100 kFCI, and each medium sample was left as it was. A decay rate of the reproduction output was evaluated for each medium sample after passage of 100 hours. In FIG. 5, dependency of this signal decay rate on the thickness of the thermally-stabilizing layer is shown.

When the medium of the present invention and the comparison sample series R2 are compared with each other in the medium samples of the thermally-stabilizing layer (intermediate magnetic layer) 15 having an equal thickness, it is proved that the medium of the present invention is superior to the comparison sample series R2 in both of the decay rate of signals and the S/N ratio. Particularly, effects in a region where the thickness of the thermally-stabilizing layer 15 is small are remarkable. This implies the following facts. By laminating the cap layer 16 on the thermally-stabilizing layer 15, a reaction of the 12 at. % Tb—88 at. % Co film of the thermally-stabilizing layer 15 and a carbon film of the protective film is suppressed, and corrosion of the thermally-stabilizing layer is suppressed, so that magnetic properties of the thermally-stabilizing layer 15 are improved and good properties thereof are obtained even in a region where the thickness of the thermally-stabilizing layer is small. It is considered that to suppress a magnetic wall motion by sandwiching the 12 at. % Tb—88 at. % Co film of the thermally-stabilizing layer 15 with grain boundary structures of the cap layer 16 and the main recording layer 14 also contributes to the enhancement of the S/N ratio.

It is considered that the reason why the S/N ratio decreases after the S/N ratio becomes maximum when the thickness of the thermally-stabilizing layer 15 is near 3 to 6 nm is that when the thickness of the thermally-stabilizing layer 15 becomes thicker, influences of exchange coupling in the thermally-stabilizing layer 15 becomes relatively significant in comparison with effects of the suppression of the magnetic wall motion arises from an exchange interaction between the thermally-stabilizing layer 15 and the cap layer 16 as well as between the thermally-stabilizing layer 15 and the main recording layer 14 and a unit of magnetization reversal becomes larger. The S/N ratio decreases to be lower than that of a sample of a CoCrPt single layer without the thermally stabilization layer when the thickness of the thermally-stabilizing layer 15 is equal to about 10 nm or more. Although the thickness of the thermally-stabilizing layer should be thicker from the viewpoint of thermal stability, it is proved that the thermally-stabilizing layer has an optimum value in consideration of the S/N ratio. By setting the thickness of the TbCo layer that is the thermally-stabilizing layer to 2 to 10 nm, the medium which is thermally stable and shows an S/N ratio superior to that of the comparison sample series R2 is obtained.

Specifically, by adding the alloy mainly containing Co and Cr as the cap layer 16 to the medium, it is possible to decrease the signal decay rate to 1% or less after passage of 100 hours that is a practical range by adoption of a thinner thermally-stabilizing layer. In a double-layered perpendicular medium in which a soft-magnetic layer is formed as an underlayer, the soft-magnetic layer serves as a return pass for magnetic flux from a head. Therefore, when a distance between the head and the soft-magnetic layer increases because of an increase of a total thickness of magnetic layers, resolution defined as a ratio of an output at a high recording density with respect to an output at a low recording density is degraded. In other words, by adopting the alloy mainly containing Co and Cr as the cap layer 16, it is possible to suppress the reduction of the resolution due to an increase of a total thickness of the magnetic layers.

In addition, since the effects to suppress the magnetic wall motion by the grain boundary structure of the cap layer 16 mainly containing Co or Cr are demonstrated, a high S/N ratio is obtained. Specifically, by giving the cap layer 16 mainly containing Co or Cr to the medium, both of a high S/N ratio and a low signal decay rate can be obtained.

[Embodiment 3]

A perpendicular magnetic recording medium having a section structure shown in FIG. 1(a), in which the thermally-stabilizing layer 15 is a multilayer film including amorphous alloy mainly containing rare earth-3d transition metals, was prepared by use of a sputtering apparatus similar to the example 1. The multilayer film including the thermally-stabilizing layer 15 was constituted by the amorphous alloy mainly containing the rare earth-3d transition metals and Co—Cr alloy or alloy mainly containing Co and Cr. As the amorphous alloy, a 17 at. % Tb—83 at. % Co film was used, and any of a Co—35 at. % Cr film, a Co—40 at. % Cr film, a Co—22 at. % Cr—10 at. % Pt film, a Co—22 at. % Cr—14 at. % Pt film, a Co—17 at. % Cr—14 at. % Pt—4 at. % B film, and a Co—18 at. % Cr—14 at. % Pt—3 at. % Ta film was used as the Co—Cr alloy or the alloy mainly containing Co and Cr.

A Ni—37.5 at. % Ta—10 at. % Zr film was used as the underlayer 12 and the structure control layer 13, and a Co—22 at. % Cr—12 at. % Pt film was used as the main recording layer 14. A Co—35 at. % Cr film was used as the cap layer 16, and a carbon film was used as the protective film 17. The thermally-stabilizing layer 15 was formed to a structure in which a total thickness of a TbCo film was fixed to 8 nm, this thickness was equally divided into two layers and four layers, and alloy layers of a thickness of 0.5 nm, which mainly containing Co—Cr alloy or mainly containing Co and Cr, were inserted therebetween. With respect to the thickness of each of the other layers, the underlayer 12 was set to 400 nm thick; the structure control layer 13, 5 nm thick; the main magnetic layer 14, 17 nm thick; the cap layer 16, 1 nm thick; and the protective layer 17, 5 nm thick. Herein, to evaluate the dependence of remnant magnetization of the recording layer on time, a soft magnetic material was not used, but a nonmagnetic Ni—37.5 at. % Ta—10 at. % Zr film was used as the underlayer 12.

For evaluation of the recording characteristics, the same conditions (ring head recording/GMR reproduction) as those of the example 1 were used. A signal-to-medium noise ratio (S/N ratio) was obtained using a reproduction output (S) of 200 kFCI and medium noise (N). These results are shown in Table 1.

TABLE 1

| Film Composition | S/N (dB) Two Layer Division | S/N (dB) Four Layer Division |
|---|---|---|
| Co-35 at. % Cr | 0.7 | 1.8 |
| Co-40 at. % Cr | 0.8 | 1.9 |
| Co-22 at. % Cr-10 at. % Pt | 0.6 | 1.6 |
| Co-22 at. % Cr-14 at. % Pt | 0.6 | 1.5 |
| Co-17 at. % Cr 14 at. % Pt-4 at. % B | 0.5 | 1.4 |
| Co-18 at. % Cr-14 at. % Pt-3 at. % Ta | 0.5 | 1.4 |

The S/N ratio is represented by a relative value relative to an S/N ratio corresponding to 0 dB when the TbCo layer is not divided. By forming the TbCo layer to have a multilayer structure by dividing the TbCo layer, it is proved that the S/N ratio of the multilayered TbCo layer is improved compared to that of the TbCo layer having no multilayer structure, which has an equal thickness in total. This is because it is considered that the influences of the exchange coupling in the TbCo layer are weakened by forming the TbCo layer to have the multilayer structure by diving the TbCo layer.

Moreover, after recording was performed at 100 kFCI, and each medium sample was left as it was. Then, when decay rate of reproduction output after 100 hours was evaluated, it was proved that a decay rate of the reproduction output was less than 1%, and a sufficient thermal stability was obtained.

Note that if the thickness of the TbCo layer per layer is too small, magnetic properties are deteriorated rapidly. Moreover, the total thickness of the magnetization layer is more increased by an amount equivalent to alloy inserted between the divided TbCo layers as the number of the division of the TbCo layer increases, thus causing a reduction in recording resolution. This is because magnetic flux widens accompanied with an increase of a distance from a head, thus making a high density recording difficult. In addition, since the increase in the number of the divided TbCo layers leads to an increase in the number of sputter chambers, industrial productivity becomes a problem. For the above reasons, it is not desirable to excessively increase the number of the division of the TbCo layer.

[Embodiment 4]

With the same sputtering apparatus and the same layer structure as those of the embodiment 1, respectively used were a Co—3 at. % Ta—5 at. % Zr film as the soft-magnetic underlayer 12; a Ni—37.5 at. % Ta—10 at. % Zr film as the structure control layer 13; a Co—22 at. % Cr—10 at. % Pt film as the main recording layer 14; a 17 at. % Tb—83 at. % Co film, a 17 at. % Tb—61 at. % Fe—22 at. % Co film, a 15 at. % Tb—42.5 at. % Fe—42.5 at. % Co film, a 12 at. % Tb—44 at. % Fe—44 at. % Co film, a 25 at. % Tb—75 at. % Co film, a 12 at. % Tb—88 at. % Co film, a 10 at. % Tb—90 at. % Co film, a 22 at. % Tb—3 at. % Pr—75 at. % Co film, a 14 at. % Tb—3 at. % Nd—83 at. % Co film, a 10 at. % Tb—2 at. % Sm—44 at. % Fe—44 at. % Co film, a 12 at. % Tb—3 at. % Gd—42.5 at. % Fe—42.5 at. % Co film or a 8 at. % Tb—2 at. % Dy—45 at. % Fe—45 at. % Co film as the thermally-stabilizing layer 15; a Co—35 at. % Cr as the cap layer 16; and a carbon film as the protective layer 17. With respect to a thickness of each layer, the underlayer 12 is 400 nm thick; the structure control layer 13, 5 nm thick; the main recording layer 14, 17 nm thick; the thermally-stabilizing layer 15, 5 nm thick; the cap layer 16, 1 nm thick; and the protective layer 17, 5 nm thick.

Recording characteristics of each magnetic recoding medium were evaluated under conditions that a single-pole-type head having a track width of 0.25 μm was used for recording, a GMR head having a shield-gap length of 0.08 μm and a track width of 0.22 μm was used for reproduction, and a head flying height was 10 nm. A signal-to-medium noise ratio S/N was obtained with an S/N ratio using a reproduction output (S) of 500 kFCI and medium noise (N). An S/N ratio of each layer used for the thermally-stabilizing layer 15 was relatively compared when the S/N ratio of the 17 at. % Tb—83 at. % Co film was set to 0 dB. The each medium was left as it was after recording was performed at 100 kFCI. Then the decay rate of the reproduction output after 100 hours was evaluated. The comparison results are shown in Table 2.

TABLE 2

| Film Composition of Thermally-Stabilizing Layer 15 | S/N (dB) | Signal Decay Rate after 100 Hours (%) |
|---|---|---|
| 17 at. % Tb-83 at. % Co | 0 | 0.3 |
| 17 at. % Tb-61 at. % Fe-22 at. % Co | 0.1 | 0.5 |
| 15 at. % Tb-42.5 at. % Fe-42.5 at. % Co | 0.2 | 0.2 |
| 12 at. % Tb-44 at. % Fe-44 at. % Co | 0.3 | 0.3 |
| 25 at. % Tb-75 at. % Co | −0.1 | 0.7 |
| 12 at. % Tb-88 at. % Co | 0.05 | 0.6 |
| 10 at. % Tb-90 at. % Co | −0.1 | 0.7 |
| 22 at. % Tb-3 at. % Pr-75 at. % Co | 0.1 | 0.6 |
| 14 at. % Tb-3 at. % Nd-83 at. % Co | 0.05 | 0.4 |
| 10 at. % Tb-2 at. % Sm-44 at. % Fe-44 at. % Co | 0.2 | 0.2 |
| 12 at. % Tb-3 at. % Gd-42.5 at. % Fe-42.5 at. % Co | 0.1 | 0.2 |
| 8 at. % Tb-2 at. % Dy-45 at. % Fe-45 at. % Co | −0.05 | 0.8 |

As apparent from Table 2, even when in stead of the 17 at. % Tb—83 at. % Co film, the 17 at. % Tb—61 at. % Fe—22 at. % Co film, the 15 at. % Tb—42.5 at. % Fe—42.5 at. % Co film, the 12 at. % Tb—44 at. % Fe—44 at. % Co film, the 25 at. % Tb—75 at. % Co film, the 12 at. % Tb—88 at. % Co film, the 10 at. % Tb—90 at. % Co film, the 22 at. % Tb—3 at. % Pr—75 at. % Co film, the 14 at. % Tb—3 at. % Nd —83 at. % Co film, the 10 at. % Tb—2 at. % Sm—44 at. % Fe—44 at. % Co film, the 12 at. % Tb—3 at. % Gd—42.5 at. % Fe—42.5 at. % Co film or the 8 at. % Tb—2 at. % Dy—45 at. % Fe—45 at. % Co film is used as the thermally-stabilizing layer 15, it is found that the same effects can be obtained.

[Embodiment 5]

By use of an in-line type high speed sputtering apparatus, a perpendicular magnetic recording medium shown by a schematic section view in FIG. 1(a) was prepared. The underlayer 12 was formed of a two-layered structure composed of a pre-coat layer which is used to improve adhesion resistance and a soft-magnetic layer, and, after the soft-magnetic layer was formed, a thermal treatment (temperature to which the substrate reaches: 450 to 500° C.) was carried out for 12 seconds with 1600 W. Subsequently, the structure control layer 13, the main recording layer 14, the thermally-stabilizing layer 15, the cap layer 16 and the protective layer 17 were sequentially formed in the same vacuum condition.

On the glass substrate, used were the pre-coat layer formed of a Ni—37.5 at. % Ta—10 at. % Zr film and the soft-magnetic layer formed of a Fe—10 at. % Ta—16 at. % C film as the underlayer 12. Used were a Ni—37.5 at. % Ta—10 at. % Zr film as the structure control layer 13; a Co—19 at. % Cr—14 at. % Pt film as the main recording layer 14; a 15 at. % Tb—42.5 at. % Fe—42.5 at. % Co film as the thermally-stabilizing layer 15; one of a Co—30 at. % Cr film, a Co—30 at. % Cr—5 at. % Ru film, a Co—30 at. % Cr—4 at. % Mo film, a Co—30 at. % Cr—5 at. % Ta film, a Co—35 at. % Cr film, a Co—40 at. % Cr film, a Co—40 at. % Cr—3 at. % B film, a Co—22 at. % Cr—10 at. % Pt film, a Co—22 at. % Cr—14 at. % Pt film, a Co—22 at. % Cr—14 at. % Pt—3 at. % B film, a Co—22 at. % Cr—14 at. % Pt—3 at. % Ta film, a Co—22 at. % Cr—14 at. % Pt—3 at. % Ti film, and a Co—22 at. % Cr—14 at. % Pt—3 at. % Nb as the cap layer 16; and a carbon film as the protective layer 17.

With respect to a thickness of each layer, the pre-coat layer and the soft-magnetic layer, which constitute the underlayer 12, were respectively set to 30 nm and 400 nm; the structure control layer 13, 5 nm; the main recording layer 14, 15 nm; the thermally-stabilizing layer 15, 4 nm; the cap layer 16, 1 nm; and the protective layer 17, 5 nm. As a comparison example, also a sample R4 in which the cap layer 16 was omitted was prepared in addition to the above sample.

Recording characteristics of each magnetic recoding medium was evaluated under conditions that a single-pole-type head having a track width of 0.25 μm was used for recording, a GMR head having a shield-gap length of 0.08 μm and a track width of 0.22 μm was used for reproduction, and a head flying height was 10 nm. An S/N ratio was obtained with an S/N ratio using a reproduction output (S) of 500 kFCI and medium noise (N). An S/N ratio of the medium of this embodiment was relatively evaluated when an S/N ratio of the comparison sample R4 was set to 0 dB. The each medium was left as it was after recording was performed at 100 kFCI. Decay rate of reproduction output after 100 hours was evaluated. These results are shown in Table 3.

TABLE 3

| Film Composition of Cap Layer | S/N (dB) | Signal Decay Rate (%) after 100 Hours |
| --- | --- | --- |
| Co-30 at. % Cr | 3 | 0.5 |
| Co-35 at. % Cr | 5 | 0.2 |
| Co-30 at. % Cr-5 at. % Ru | 3.5 | 0.4 |
| Co-30 at. % Cr-4 at. % Mo | 4 | 0.3 |
| Co-30 at. % Cr-5 at. % Ta | 3.5 | 0.3 |
| Co-40 at. % Cr | 4.5 | 0.2 |
| Co-40 at. % Cr-3 at. % B | 5 | 0.2 |
| Co-22 at. % Cr-10 at. % Pt | 2 | 0.7 |
| Co-22 at. % Cr-14 at. % Pt | 2 | 0.7 |
| Co-22 at. % Cr-14 at. % Pt-3 at. % B | 3.5 | 0.4 |
| Co-22 at. % Cr-14 at. % Pt-3 at. % Ta | 2.5 | 0.6 |
| Co-22 at. % Cr-14 at. % Pt-3 at. % Ti | 3 | 0.5 |
| Co-22 at. % Cr-14 at. % Pt-3 at. % Nb | 3 | 0.5 |
| Comparison Sample R4 | 0 | 8 |

As shown in Table 3, while a decay of the reproduction output after 100 hours is 8% in the comparison sample R4, it is found that the decay of the reproduction output after 100 hours is less than 1% and the medium of this embodiment is excellent in thermal stability, when the Co—30 at. % Cr film, the Co—35 at. % Cr film, the Co—30 at. % Cr—5 at. % Ru film, the Co—30 at. % Cr—4 at. % Mo film, the Co—30 at. % Cr—5 at. % Ta film, the Co—40 at. % Cr film, the Co—40 at. % Cr—3 at. % B film, the Co—22 at. % Cr—10 at. % Pt film, the Co—22 at. % Cr—14 at. % Pt film, the Co—22 at. % Cr—14 at. % Pt—3 at. % B film, the Co—22 at. % Cr—14 at. % Pt—3 at. % Ta film, the Co—22 at. % Cr—14 at. % Pt—3 at. % Ti film, and the Co—22 at. % Cr—14 at. % Pt—3 at. % Nb film are used. Moreover, the sample of this embodiment is superior to the comparison sample R4 by about 2 to 5 dB also with regard to the S/N ratio. Therefore, it is found that this embodiment demonstrates effects to improve the recording characteristics. By using the alloy mainly containing Co and Cr as the cap layer 16, it is possible to obtain both the high thermal stability and the high S/N ratio.

[Embodiment 6]

By use of the same in-line type high speed sputtering apparatus as the embodiment 5, a perpendicular magnetic recording medium shown by a schematic section view in FIG. 1(a) was prepared. The underlayer 12 was formed of a two-layered structure composed of a pre-coat layer and a soft-magnetic layer, and, after the soft-magnetic layer was formed, a thermal treatment (temperature to which the substrate reaches: 450 to 500° C.) was carried out for 12 seconds with 1600 W Subsequently, the structure control layer 13, the main recording layer 14, the thermally-stabilizing layer 15, the cap layer 16 and the protective layer 17 were sequentially formed in the same vacuum condition.

Used were the pre-coat layer formed of a Ni—37.5 at. % Ta—10 at. % Zr film and the soft-magnetic layer formed of a Fe—10 at. % Ta—16 at. % C film as the underlayer 12. The structure control layer 13 was formed into a two-layered structure in which a Co—40 at. % Cr film is laminated on the Ni—37.5 at. % Ta—10 at. % Zr film. As the main recording layer 14, a Co—22 at. % Cr—14 at. % Pt film, a Co—17 at. % Cr—14 at. % Pt—4 at. % B film, a Co—18 at. % Cr—14 at. % Pt—3 at. % Ta film, a Co—17 at. % Cr—14 at. % Pt—4 at. % Nb film and a Co—18 at. % Cr—14 at. % Pt—3 at. % Ti film were used. As the thermally-stabilizing layer 15, a 14 at. % Tb—43 at. % Fe—43 at. % Co film was used. As the cap layer 16, a Co—40 at. % Cr film was used. As the protective layer 17, a carbon film was used. As a comparison sample, for each material of the main recording layers, sample series R5 in which the cap layer 16 was omitted were prepared.

With respect to a thickness of each layer, the pre-coat layer and the soft-magnetic layer, which constitute the underlayer 12, were respectively set to 30 nm and 400 nm; the structure control layer 13, 4 nm and 3 nm, respectively; the main recording layer 14, 16 nm; the thermally-stabilizing layer 15, 5 nm; the cap layer 16, 1 nm; and the protective layer 17, 5 nm.

Recording characteristics of each magnetic recoding medium were evaluated under conditions of a head flying height of 10 nm by use of a single-pole-type head having a track width of 0.25 μm for recording and a GMR head having a shield-gap length of 0.08 μm and a track width of 0.22 μm for reproduction. An S/N ratio was obtained with a reproduction output (S) of 500 kFCI and medium noise (N). An S/N ratio of the medium of this embodiment was evaluated relatively to an S/N ratio of the comparison sample series R5 when the S/N ratio of the comparison sample series R5 was set to 0 dB. Moreover, after recording was performed at 100 kFCI, the each medium sample was left as it was, and decay rate of the reproduction output after 100 hours was evaluated. These results are shown in Table 4.

TABLE 4

| | Present Embodiment | | Comparison Sample Series R5 |
| --- | --- | --- | --- |
| Film Composition of Main Recording Layer | S/N (dB) | Signal Decay Rate (%) after 100 Hours | Signal Decay Rate (%) after 100 Hours |
| Co-22 at. % Cr-14 at. % Pt | 3 | 0.4 | 8 |
| Co-17 at. % Cr-14 at. % Pt-4 at. % B | 5 | 0.3 | 7 |
| Co-18 at. % Cr-14 at. % Pt-2 at. % Ta | 2 | 0.2 | 5 |
| Co-17 at. % Cr-14 at. % Pt-4 at. % Nb | 4 | 0.3 | 7 |
| Co-18 at. % Cr-14 at. % Pt-3 at. % Ti | 3 | 0.3 | 6 |

As seen in Table 4, when, as the main recording layer 14, the Co—22 at. % Cr—14 at. % Pt film, the Co—17 at. % Cr—14 at. % Pt—4 at. % B film, the Co—18 at. % Cr—14 at. % Pt—3 at. % Ta film, the Co—17 at. % Cr—14 at. % Pt—4 at. % Nb film and the Co—18 at. % Cr—14 at. % Pt—3 at. % Ti film are used, while a decay rate of reproduction output after 100 hours is equal to 5% or more in the comparison sample series R5, the decay rate of the reproduction output of this embodiment is less than 1%, and it is found that the medium of this embodiment is excellent in thermal stability. With respect to the S/N ratio, a property which is more excellent by about 2 to 4 dB than the comparison sample series R5 was obtained in this embodiment.

Specifically, similarly when the CoCrPtB film, the CoCrPtTa film, the CoCrPtNb film and the CoCrPtTi film were used in stead of the CoCrPt film as the main recording layer 14, the thermal stability and the high S/N ratio can be also realized by combining the thermally-stabilizing layer 15 and the cap layer 16.

[Embodiment 7]

Figure 6A:
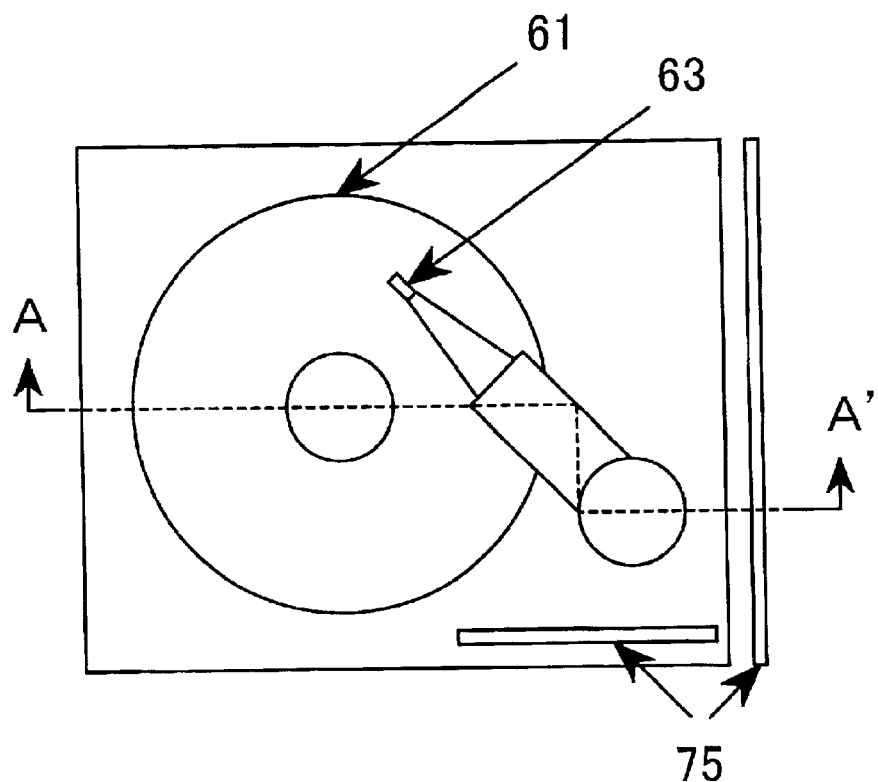
FIG. 6(a) is a plan view of a magnetic storage apparatus.
Figure 6B:
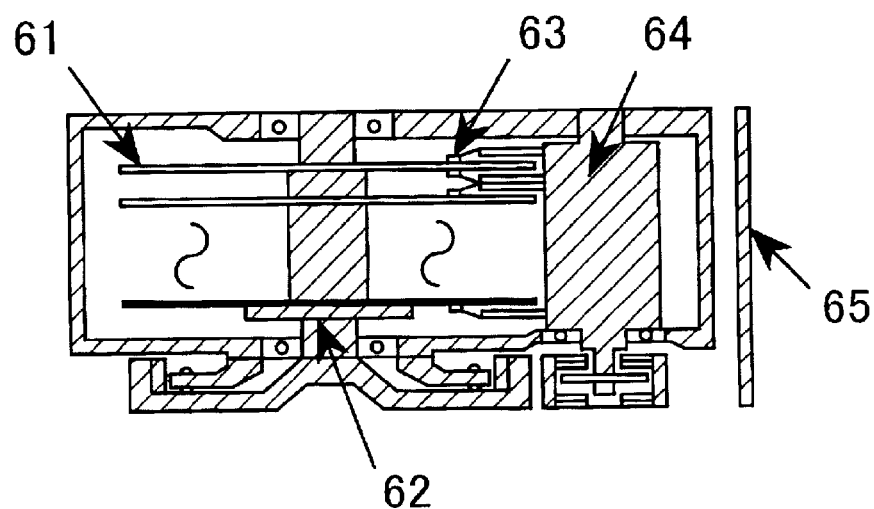
FIG. 6(b) is a cross-sectional view taken along the line A—A of FIG. 6(a).

An outline of a magnetic storage apparatus of the present invention is shown in FIG. 6(a) and FIG. 6(b). This apparatus is a magnetic storage apparatus which has a well known structure comprising a perpendicular magnetic recording media 61, a driving section 62 for driving the media 61, a magnetic head 63, driving means 64 for driving the magnetic head 63, and recording/reproduction signal processing means 65 of the magnetic head 63. The magnetic head is a recording/reproduction separation type magnetic head formed on a magnetic head slider. A track width of a single-pole-type head is 0.25 µm. A shield-gap length of a GMR head for reproduction is 0.08 µm and a track width thereof is 0.22 µm.

The medium shown in the embodiment 5 was incorporated in the foregoing magnetic storage apparatus, and an evaluation for recording characteristics were made under conditions of a head flying height of 10 nm, a linear recording density of 590 kBPI and a track density of 89 kTPI. A recording/reproduction condition that is 52.5 bG/in$^2$ with regard to an areal recording density was fully satisfied in a temperature range of 10 to 75° C.

In the embodiments of the present invention, though the present invention was described by use of the examples of the cap layer, the thermally-stabilizing layer, the main recording layer, the structure control layer and the underlayer, it is natural that the same effects should be obtained with use of any combinations of other materials described in the embodiments.

According to the present invention, the magnetic storage apparatus can be realized, which has the excellent signal-to-noise ratio at high recording densities and has the high thermal stability.

What is claimed is:

1. A perpendicular magnetic recording medium comprising:

a magnetic layer formed above a substrate, said magnetic layer containing Co and Cr as the main component;

a first layer formed on an opposite side of the magnetic layer relative to the substrate, said first layer including an amorphous alloy layer containing rare earth metals and 3d transition metals as the main components, wherein the thickness of said first layer in the ranges from 2 nm to 10 nm; and a second layer formed on said first layer, said second layer containing Co and Cr wherein the thickness of said second layer is in the range from 0.5 nm to 10 nm.

2. The perpendicular magnetic recording medium according to claim 1, wherein said first layer is a multilayer film including the amorphous alloy layer containing the rare earth metals and the 3d transition metals as the main components and other layers.

3. The perpendicular magnetic recording medium according to claim 2, wherein said multilayer film is one composed of the amorphous alloy layer containing the rare earth metals and the 3d transition metals as the main components and an alloy film containing Co and Cr as the main components.

4. The perpendicular magnetic recording medium according to claim 1, wherein said first layer contains one of TbFeCo, TbCo and TbFe as the main component.

5. A magnetic storage apparatus comprising:

a perpendicular magnetic recording medium;

a magnetic recording head; and a signal reproduction head, wherein said perpendicular magnetic recording media include a magnetic layer formed on a substrate, the magnetic layer containing Co and Cr as the main component; a first layer formed on an opposite side of the magnetic layer relative to the substrate, said first layer including an amorphous alloy layer containing rare earth metals and 3d transition metals as the main components; and a second layer formed on said first layer including the amorphous alloy layer, said second layer containing Co and Cr, wherein the thickness of said first layer is in the ranges from 2 nm to 10 nm and wherein the thickness of said second layer is in the range from 0.5 nm to 10 nm.

6. The perpendicular magnetic recording medium according to claim 1, wherein said magnetic layer is the main recording layer of said recording medium.

7. The perpendicular magnetic recording medium according to claim 1, wherein said magnetic layer is made of a material selected from the group consisting of Co—Cr—Ta, Co—Cr—Pt, Co—Cr—Pt—Ta and Co—Cr—Pt—B.

8. The perpendicular magnetic recording medium according to claim 1, wherein said first layer is a thermal-stabilizing layer of the recording medium.

9. The perpendicular magnetic recording medium according to claim 1, wherein said second layer is provided on the surface of the first layer.

10. The perpendicular magnetic recording medium according to claim 1, further comprising a protective and lubricant layer on the second layer.

11. The perpendicular magnetic recording medium according to claim 10, wherein said protective and lubricant layer includes carbon, and the second layer suppresses reaction of the carbon.

12. The perpendicular magnetic recording medium according to claim 11, wherein said protective and lubricant layer, which includes carbon, is made of a material selected from the group consisting of carbon, silicon carbide and boron carbide.

* * * * *